(12) United States Patent
Elmar

(10) Patent No.: US 11,427,411 B2
(45) Date of Patent: Aug. 30, 2022

(54) GUIDING DEVICE AS WELL AS GRIPPING AND TRANSPORT DEVICE FOR GRIPPING, HOLDING, GUIDING AND TRANSPORTING BOTTLE-LIKE CONTAINERS

(71) Applicant: TYROLON-SCHULNIG GMBH, Hochfilzen (AT)

(72) Inventor: Schulnig Elmar, St. Jakob (AT)

(73) Assignee: TYROLON-SHULNIG GMBH, Hochfilzen (AT)

( * ) Notice: Subject to any disclaimer, the term of this patent is extended or adjusted under 35 U.S.C. 154(b) by 0 days.

(21) Appl. No.: 17/234,210

(22) Filed: Apr. 19, 2021

(65) Prior Publication Data

US 2021/0362959 A1 Nov. 25, 2021

(30) Foreign Application Priority Data

May 19, 2020 (EP) .................................... 20175408

(51) Int. Cl.
*B65G 47/84* (2006.01)
*B65G 47/86* (2006.01)

(52) U.S. Cl.
CPC .... *B65G 47/847* (2013.01); *B65G 2201/0244* (2013.01)

(58) Field of Classification Search
CPC .................. B65G 47/84; B65G 47/847; B65G 2201/0244
USPC ........................... 198/441, 468.2, 468.8, 794
See application file for complete search history.

(56) References Cited

U.S. PATENT DOCUMENTS

| | | | | |
|---|---|---|---|---|
| 5,826,400 A * | 10/1998 | Martin | ..................... | B67C 7/004 53/367 |
| 7,007,793 B2 * | 3/2006 | Stocchi | ................ | B65G 47/846 198/803.11 |
| 7,261,197 B2 * | 8/2007 | Nickey | ................ | B65G 47/847 198/346.2 |
| 7,273,144 B2 * | 9/2007 | Guernieri | ............. | B65G 47/846 198/479.1 |
| 9,027,732 B2 * | 5/2015 | Santi | ..................... | B65G 47/248 198/408 |
| 9,045,284 B2 * | 6/2015 | Turlotte | ................. | B65G 19/02 |
| 9,181,043 B1 * | 11/2015 | Goudy | .................... | B65G 29/00 |
| 9,302,856 B2 * | 4/2016 | Papsdorf | ............. | B65G 47/846 |
| 9,340,364 B2 * | 5/2016 | Papsdorf | ............. | B65G 47/846 |
| 9,567,165 B2 * | 2/2017 | Clüsserath | ............ | B65G 29/00 |
| 9,731,911 B2 * | 8/2017 | Fahldieck | ............ | B65G 47/846 |
| 9,969,117 B2 * | 5/2018 | Hoellriegl | ........... | B29C 49/4205 |
| 10,399,795 B1 * | 9/2019 | Jang | ...................... | B65G 47/846 |

(Continued)

FOREIGN PATENT DOCUMENTS

| | | |
|---|---|---|
| CN | 103867675 A | 6/2014 |
| CN | 106523634 A | 3/2017 |

(Continued)

*Primary Examiner* — Douglas A Hess
(74) *Attorney, Agent, or Firm* — John A. Miller; Shumaker, Loop & Kendrick, LLP

(57) ABSTRACT

A guiding device for a positioning plate of a transport device for gripping, holding, guiding and transporting bottle-like containers. In order to provide non-rotational guiding and stabilizing of the positioning plate and/or gripper devices, the guiding device includes an elongated hollow body having a plurality of guide recesses that are formed along the hollow body. A transport device having such a guiding device is also provided.

11 Claims, 2 Drawing Sheets

(56) References Cited

U.S. PATENT DOCUMENTS 10,870,544 B2 * 12/2020 Schulnig .............. B65G 47/847
10,946,996 B2 * 3/2021 Baumeister .......... B65G 47/847

FOREIGN PATENT DOCUMENTS

| CN | 207390894 U | 5/2018 |
| --- | --- | --- |
| CN | 106348197 B | 8/2018 |
| EP | 2093169 A1 | 8/2009 |
| EP | 3239078 A1 | 11/2017 |
| JP | H02117515 A | 5/1990 |

* cited by examiner

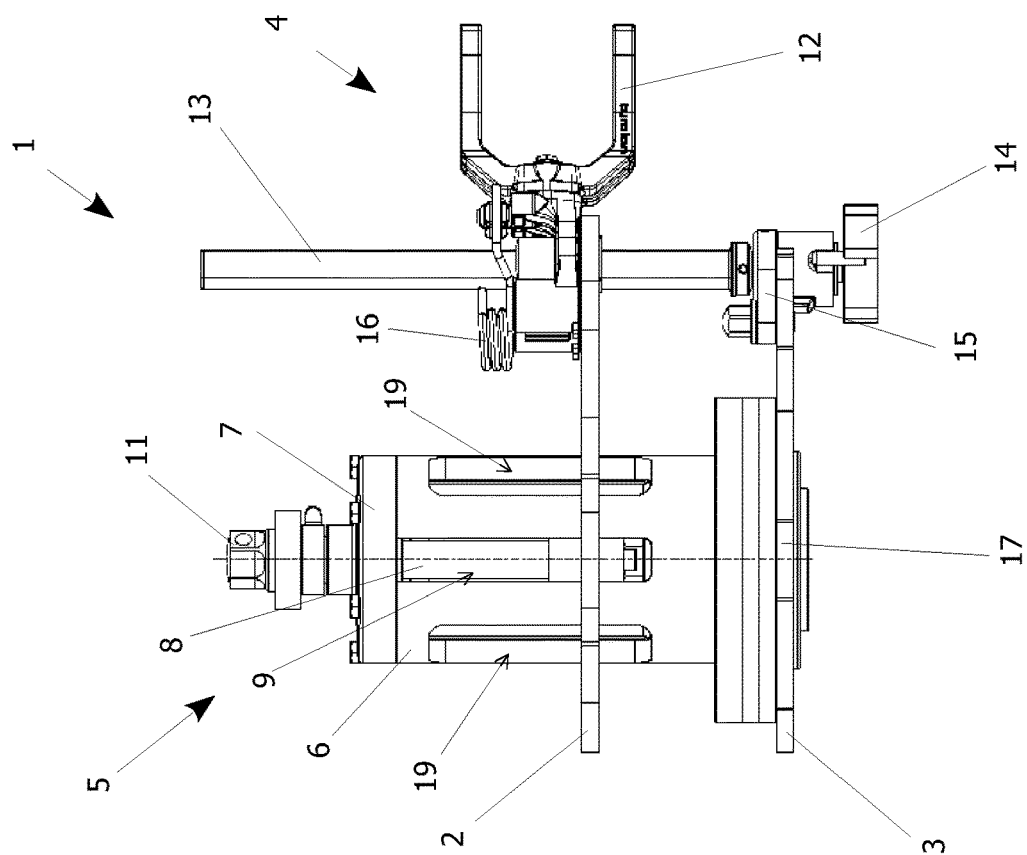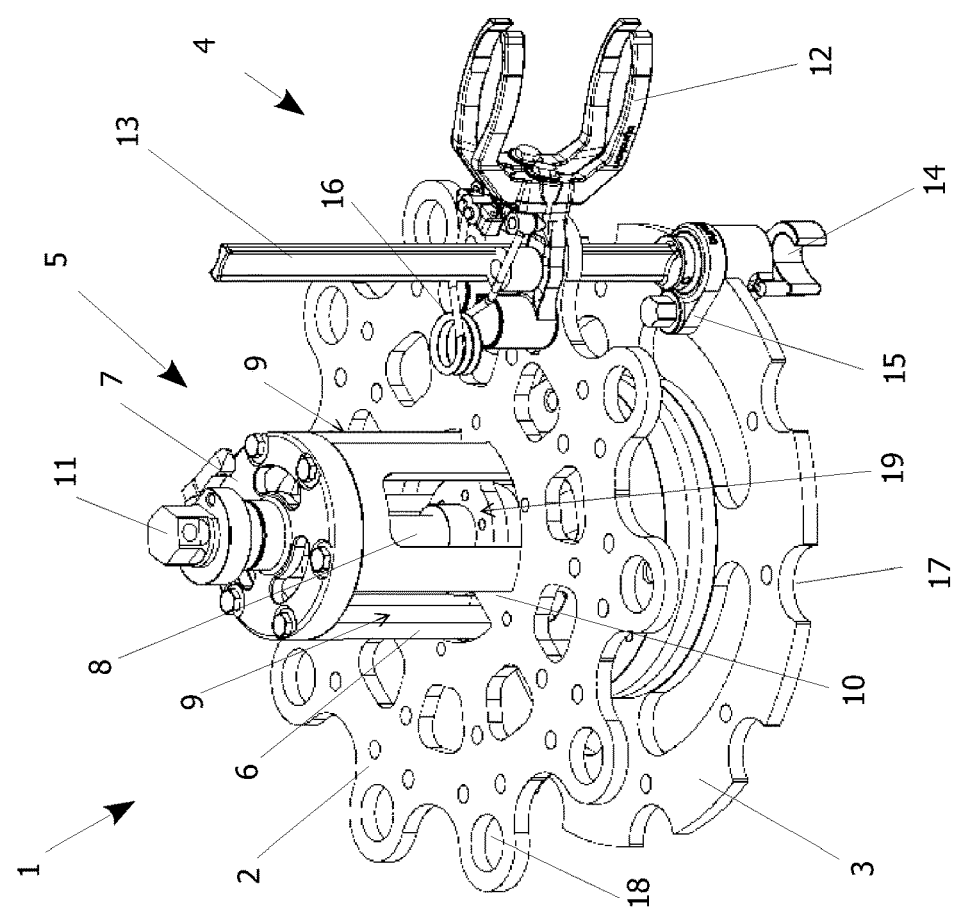
Fig. 4
Fig. 3

GUIDING DEVICE AS WELL AS GRIPPING AND TRANSPORT DEVICE FOR GRIPPING, HOLDING, GUIDING AND TRANSPORTING BOTTLE-LIKE CONTAINERS

CROSS-REFERENCE TO RELATED APPLICATIONS

This application claims priority to European Patent Application Serial No. 20 175 408.2 filed May 19, 2020, the entire disclosure of which is hereby incorporated herein by reference.

BACKGROUND

Field

This disclosure relates to a guiding device for a positioning plate of a gripping and transport device for containers. The disclosure moreover relates to a gripping and transport device for gripping, holding, guiding and transporting particularly bottle-like containers having such a guiding device as a height adjustment device.

Discussion

Gripping and transport devices for gripping, holding and/or guiding containers are already known from the prior art, particularly by the name of "clamping stars." Gripping and transport devices have a plurality of gripper devices with pairs of gripper arms. They are primarily used in the production line processing of containers or receptacles particularly intended to be filled with liquids or other bulk goods.

The bulk processing of such containers/receptacles requires regular repositioning of the gripping and transport devices to the respectively different container types. These types of containers can differ considerably from each other in their general shape, in particular their height, width and/or diameter.

A production line processing of large container lot sizes likewise makes adjustment of the gripping and transport devices mandatory in order to be able to ensure safe handling by the gripping and transport device and prevent waste in the sense of incorrect filling, incorrect labeling or destroyed containers.

Moreover, hygienic aspects within the assembly-line production line also need to be considered, particularly when filling or respectively subsequently processing food or the like.

Known systems have the disadvantage of extensive machine retrofitting being required to adjust the height so as to adapt to the different types of containers to be processed. One needs to accept a complete machine standstill during the retrofitting process. Repositioning for different container types is consequently time-consuming and costly.

There are already gripping and transport devices in which a positioning plate with gripper devices or the gripper devices themselves are height-adjustable. However, these designs exhibit numerous disadvantages due to additional components being needed for the non-rotational guiding and stabilizing of the positioning plate and/or the gripper devices during a height adjustment.

SUMMARY

The disclosure is based on the task of providing an advantageous height adjustment of the gripper devices as well as a gripping and transport device for the gripping, holding, guiding and transporting of containers, wherein a simple, quick and economical height adjustment is to be provided in conjunction with simplified maintenance and retrofitting.

This task is solved by a guiding device in accordance with independent claim 1 as well as a gripping and transport device in accordance with independent claim 9. Further advantageous developments of the inventive subject matter are specified in the dependent claims.

In detail, a guiding device for a positioning plate of a transport device for gripping, holding, guiding and transporting bottle-like containers is provided. The guiding device is characterized by an elongated hollow body having a plurality of guide recesses which are each formed along the hollow body.

This has the advantage of providing both a guidance and stabilization and/or accommodation for one or more positioning plates in and/or via the guiding device. The guide recesses are thereby preferably shaped identically to each other in order to enable the positioning plate to move smoothly along the hollow body during the height adjustment.

In a further advantageous embodiment, the hollow body is formed as a hollow cylinder and the guide recesses are rectilinear with a constant width and equidistanced from one another. A hollow cylinder is easier and more economical to produce, whereby other forms of the hollow body are also possible such as, for example, a cross-sectionally square tube and/or sleeve or a conical hollow body. The linear form of the recesses is particularly of advantage for non-rotational guidance.

Likewise to have proven advantageous is for the guide recesses to respectively comprise latching projections such that the positioning plate can be non-rotatably inserted at specific heights. To this end, the latching projection can be formed similar to a bayonet catch that comes into operative engagement with the positioning plate or a part thereof.

For the easier inserting of a positioning plate into the guiding device and simultaneously providing a rotational locking, the guide recesses preferably extend to an end of the hollow body such that sections of the positioning plate can be inserted into the hollow body, in particular into the guide recesses, from said end.

In addition to the rotational locking, the guiding device can preferably exhibit a height adjustment axle arranged within the hollow body that is connectable to one or more positioning plates and at least parts or sections thereof being displaceably and/or rotatably supported. The guiding device itself can thus provide a height adjustment function for the positioning plate.

The height adjustment axle exhibits an elongated sleeve and a rod arranged within the sleeve as an advantageous embodiment, wherein the sleeve is displaceable and/or rotatable about the rod for the height adjustment. While the rod serves the sleeve as guidance and stabilization, the sleeve is connected or respectively connectable to the positioning plate and displaceable and/or axially movable along the rod.

According to a further preferential embodiment, the height adjustment axle is at least partially or sectionally spindle-shaped. A more precise lifting movement of the height adjustment axle or parts thereof can thus be provided by means of the spindle rotation.

To save on material and/or weight, one or more in particular rectangular or respectively window-like or window-shaped cavities/recesses are advantageously formed in each case between the guide recesses. These are preferably formed and arranged equidistant from and identical to each other. These window-like cavities also establish better access to the interior of the guiding device, in particular the hollow body, and thereby enable easier and faster cleaning of the interior.

According to the disclosure, a gripping and transport device for the gripping, holding, guiding and transport of in particular bottle-like containers is provided with at least one positioning plate, wherein a plurality of gripper devices are or can be secured to the positioning plate. The transport device thereby comprises a guiding device according to the disclosure, wherein the positioning plate is secured to and in operative engagement with the guiding device such that the positioning plate is non-rotational and height-adjustable.

The positioning plate is preferably height-adjustable by manual actuating of the guiding device and/or by a motor of the guiding device, wherein the motor is arranged within or on the hollow body.

Likewise to have proven advantageous is for the positioning plate to comprise guide strips which extend through the guide recesses and are guided by same during a height adjustment. The strips and/or the guide recesses are thereby designed and/or in operative engagement with one another such that sufficient play is provided for height adjustment or displacement respectively, preferably without tilt. Thus, in addition to the opposite strip and guide recess faces, additional guide elements can be formed such as, for example, tongue and groove systems in order to improve the guidance of the positioning plate.

In order to provide a stable bearing for the positioning plate, the guide strips are preferably connected or respectively secured to the guiding device, in particular to the height adjustment axle.

In a further advantageous embodiment, the guiding device is arranged coaxially to a rotational axis of the gripping and transport device and secured to same. Additionally, the guiding device is preferably of rotationally symmetrical design. Imbalance upon rotation of the transport device and thus possible damage is thereby prevented.

BRIEF DESCRIPTION OF THE DRAWINGS

The figures described in the following relate to preferential exemplary embodiments of the inventive guiding device as well as the inventive gripping and transport device, whereby these figures serve not as a limitation but instead essentially to illustrate the disclosure. Elements from different figures but having the same reference numerals are identical; therefore, the description of an element from one figure also applies to identically named and/or identically numbered elements in other figures.

It is to be noted at this point that all the above-described components or features respectively are claimed as essential to the disclosure on their own and in any combination, in particular the specifics illustrated in the figures. Modifications thereof are familiar to the person skilled in the art.

FIG. 3 is a perspective view of a gripping and transport device having a further guiding device; and FIG. 4 is a side view of the gripping and transport device from FIG. 3.

DETAILED DESCRIPTION OF THE EMBODIMENTS

Figure 1:
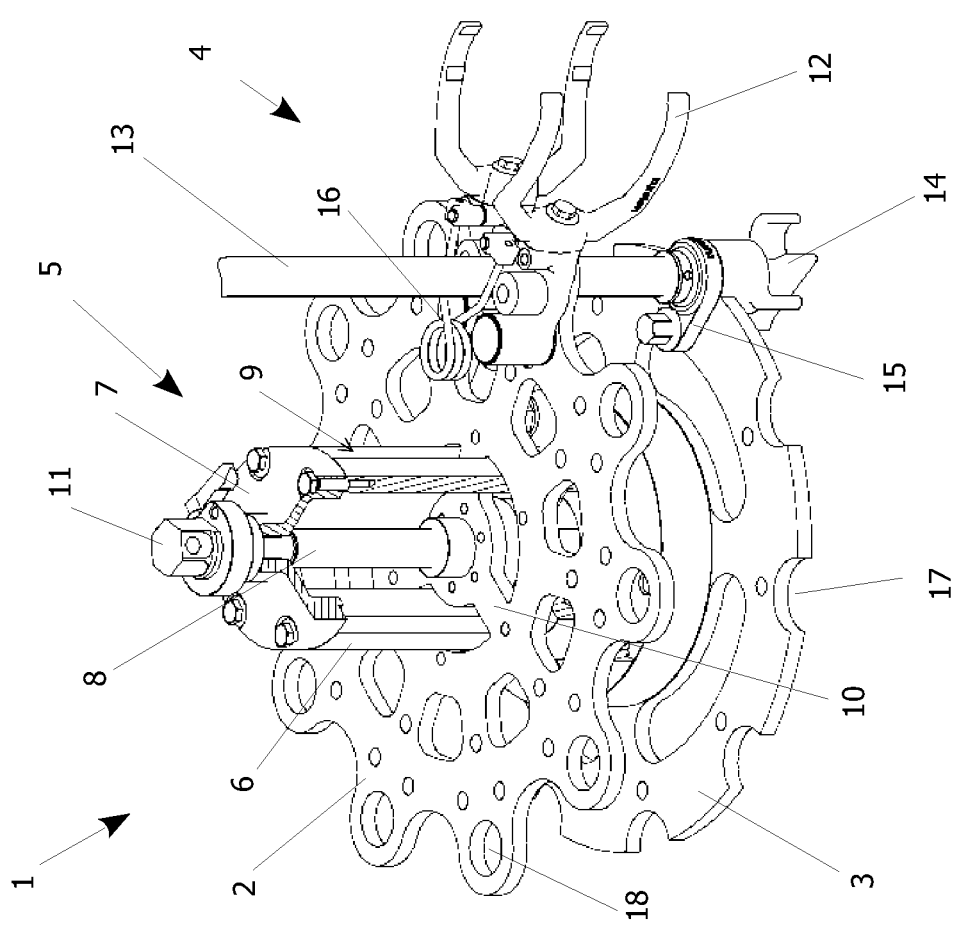
FIG. 1 is a perspective view of a gripping and transport device having a guiding device.

The gripping and transport device 1 shown in FIG. 1 is rotatable about a vertical axis of rotation and comprises a supporting plate 3 and a height-adjustable positioning plate 2. A guiding device 5 is coaxially mounted on an upper side of the transport device 1 above the supporting plate 3. The guiding device 5 comprises a hollow cylinder 6, a cover element 7, a height adjustment axle 8 as well as a height adjustment screw 11. The hollow cylinder 6 is provided with vertical guide recesses 9 in order to guide the positioning plate 2 along the rotational axis. To that end, guide strips 10 of the positioning plate 2 are displaceably arranged in the guide recesses 9 and designed so as to enable non-rotational movement along the rotational axis, also referred to as the vertical adjustment of the positioning plate 2. The guide recesses 10 run in a star shape to the height adjustment axle 8 and are affixed to same in such a manner that the height of the positioning plate 2 is adjusted by manipulating the height adjustment axle 8, particularly the height adjustment screw 11 connected to the height adjustment axle 8. The cover element 7 is screwed onto the upper end of the hollow cylinder 6. The height adjustment axle 8 is rotatably mounted at the center of the cover element 7, wherein the height adjustment screw 11 connected to the height adjustment axle 8 is arranged on the upper side of the cover element 7. The height of the positioning plate 2 can thereby be adjusted manually or by means of an additional motor. The transport device 1 can be equipped with a plurality of gripper devices, whereby only one gripper device 4 is depicted in the figures shown herein for the sake of clarity. The gripper device 4 comprises a pair of gripper arms 12, a spring element 16 as a closing means, a control camshaft 13 as an opening means, a bearing element 15 as well as an actuating element 14. The gripper arms 12 are pivotally attached by their respective end portion to the outer edge of the circular positioning plate 2. The spring element 16 is connected to both gripper arms 12 of a gripper device 4 such that there is always a ready force for closing the gripper arms 12. The control camshaft 13 is rotatable about its own longitudinal axis by means of a bearing element 15 and fixed to the supporting plate 3 and is additionally arranged in a bearing concavity 17 of the supporting plate 3. The control camshaft 13 runs through a circular bearing bore 18 of the positioning plate 2 and is arranged between the gripper arms 14 of the gripper device 4. The actuating element 14 is provided at the lower end of the control camshaft 13, its manipulation effecting the rotation of the control camshaft 13 and the opening of the gripper arm device 4, or the gripper arm pair 12 respectively.

Figure 2:
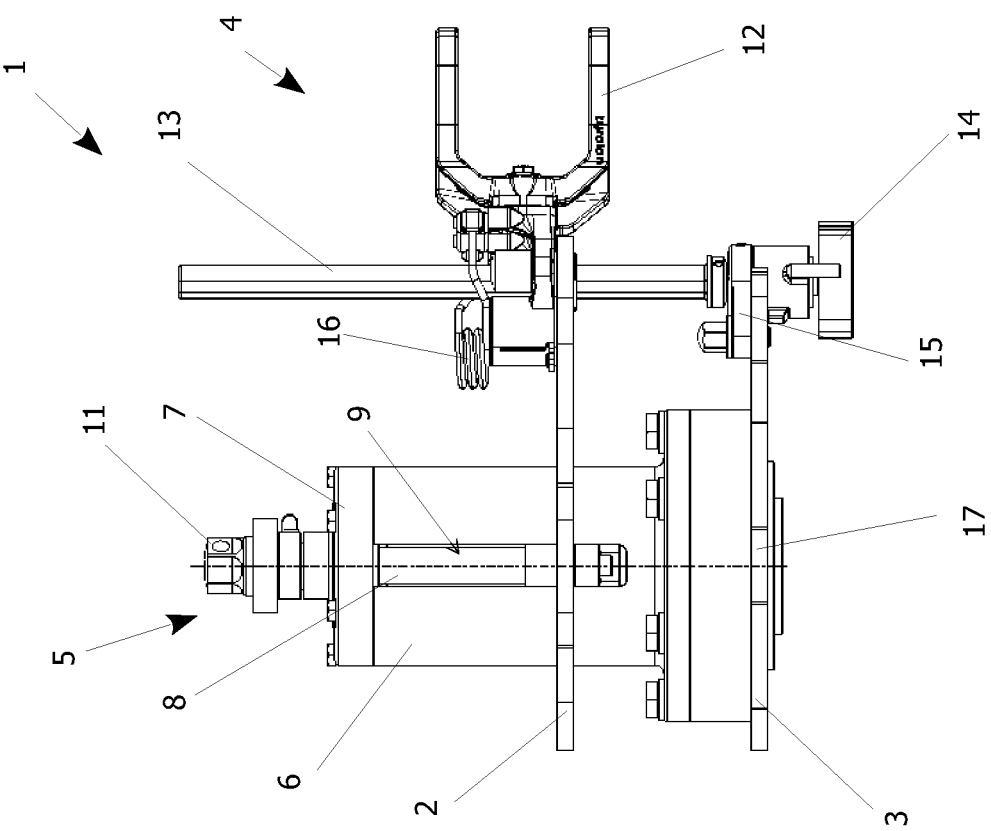
FIG. 2 is a side view of the gripping and transport device from FIG. 1.

FIG. 2 shows the gripping and transport device 1 from FIG. 1 in side view. Thereby visible is the mounting of the guiding device 5 to the transport device 1 by means of a flange formed beneath the positioning plate 2. The guide recess 9 is rectangle-shaped and open to the upper side or respectively upper end of the hollow cylinder 6. The hollow cylinder 6 can thus be manufactured as one part, whereby a multi-part hollow cylinder design is however likewise possible in other embodiments.

The gripping and transport device 1 shown in FIG. 3 differs from the transport device from FIG. 1/FIG. 2 in respect of the hollow cylinder 6 and the cover element 7. Three window-shaped or respectively rectangular recesses 19 are formed in the hollow cylinder 6, wherein one recess 19 is always arranged between two guide recesses 9. These recesses 19 serve on the one hand to save on material and weight and on the other hand as access into the interior of the hollow cylinder 6 for easier and faster cleaning of the hollow cylinder 6 and/or any components within the hollow cylinder. In other embodiments, appropriate, in particular insertable, elements of the positioning plate 2 such as, for example, pins, bolts or the like can operatively engage with the recess 19 or protrude into same respectively in order to establish an additional guidance and/or height adjustment limitation. The cover element 7 likewise comprises arch-shaped cavities in order to enable material and weight savings.

FIG. 4 shows the gripping and transport device 1 from FIG. 3 in side view. Here one can see that the lower edge of the guide recesses 9 and the cavity or respectively recess 19 of the hollow cylinder 6 are at the same height.

LIST OF REFERENCE NUMERALS

1 transport device
2 positioning plate
3 supporting plate
4 gripper device
5 guiding device
6 hollow cylinder
7 cover element
8 height adjustment shaft/axle
9 guide recess
10 guide strip
11 height adjustment screw
12 gripper arm
13 control spindle/control camshaft
14 actuating element
15 control spindle bearing element
16 closing means/spring element
17 supporting plate bearing concavity
18 positioning plate bearing bore
19 cavity/window/recesses

What is claimed is:

1. A guiding device for a positioning plate of a transport device for gripping, holding, guiding and transporting bottle-like containers, said guiding device comprising an elongated hollow body having a plurality of guide recesses that are formed along the hollow body, wherein a height adjustment axle arranged within the hollow body that is connectable to one or more positioning plates and at least parts or sections thereof is displaceably and/or rotatably supported.

2. The guiding device according to claim 1, wherein the hollow body is a hollow cylinder and the guide recesses are rectilinear with a constant width and equidistanced from one another.

3. The guiding device according to claim 1, wherein the guide recesses include latching projections such that the positioning plate can be non-rotatably inserted at specific heights.

4. The guiding device according to claim 1, wherein the guide recesses extend to an end of the hollow body such that sections of the positioning plate can be inserted into the guide recesses from the end.

5. The guiding device according to claim 1, wherein the height adjustment axle exhibits an elongated sleeve and a rod arranged within the sleeve, and wherein the sleeve is displaceable and/or rotatable about the rod for the height adjustment.

6. The guiding device according to claim 1, wherein the height adjustment axle is at least partially or sectionally spindle-shaped.

7. The guiding device according to claim 1, wherein one or more rectangular cavities are formed between the guide recesses.

8. A gripping and transport device for gripping, holding, guiding and transporting bottle-like containers, said gripping and transport device comprising:
    at least one positioning plate;
    a plurality of gripper devices secured to the at least one positioning plate; and
    a guiding device, wherein the at least one positioning plate is secured to and in operative engagement with the guiding device such that the at least one positioning plate is non-rotational and height-adjustable, and wherein the at least one positioning plate includes guide strips that extend through guide recesses and are guided by same during a height adjustment.

9. The gripping and transport device according to claim 8, wherein the at least one positioning plate is height-adjustable by manual actuating of the guiding device and/or by a motor of the guiding device, and wherein the motor is arranged within or on the hollow body.

10. The gripping and transport device according to claim 8, wherein the guide strips are connected or respectively secured to the guiding device.

11. The gripping and transport device according to claim 8, wherein the guiding device is arranged coaxially to a rotational axis of the gripping and transport device and secured to same.

* * * * *